United States Patent
Kim et al.

(10) Patent No.: US 8,718,924 B2
(45) Date of Patent: May 6, 2014

(54) METHOD AND APPARATUS FOR ROAD GUIDANCE USING MOBILE TERMINAL

(75) Inventors: Hee Won Kim, Suwon-si (KR); Yee Eun Yoon, Seoul (KR); Yu Ran Kim, Seoul (KR); Jee Yeun Wang, Seoul (KR); Min Hwa Jung, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 416 days.

(21) Appl. No.: 12/652,461

(22) Filed: Jan. 5, 2010

(65) Prior Publication Data

US 2010/0174483 A1 Jul. 8, 2010

(30) Foreign Application Priority Data

Jan. 7, 2009 (KR) .................. 10-2009-0001013

(51) Int. Cl.
*G01C 21/26* (2006.01)

(52) U.S. Cl.
USPC ........... 701/409; 701/400; 701/412; 701/418; 701/425; 701/426; 701/446; 701/447; 701/469; 701/453

(58) Field of Classification Search
USPC ......... 701/400, 409, 412, 418, 425, 426, 430, 701/446, 447, 469, 532, 208
See application file for complete search history.

(56) References Cited

U.S. PATENT DOCUMENTS

| | | | |
|---|---|---|---|
| 6,177,905 B1* | 1/2001 | Welch | 342/357.75 |
| 6,320,496 B1* | 11/2001 | Sokoler et al. | 340/407.1 |
| 6,947,834 B2* | 9/2005 | Duckeck | 701/410 |
| 7,581,859 B2* | 9/2009 | Lynam | 362/494 |
| 7,889,101 B2* | 2/2011 | Yokota | 340/995.19 |
| 7,945,852 B1* | 5/2011 | Pilskalns | 715/230 |
| 8,024,314 B2* | 9/2011 | Wang et al. | 707/706 |
| 2004/0249565 A1* | 12/2004 | Park | 701/200 |
| 2007/0087828 A1* | 4/2007 | Robertson | 463/42 |
| 2007/0210937 A1* | 9/2007 | Smith et al. | 340/995.1 |
| 2008/0076579 A1* | 3/2008 | Tabata | 463/42 |

(Continued)

FOREIGN PATENT DOCUMENTS

| | | |
|---|---|---|
| JP | 10-103988 | 4/1998 |
| JP | 11-337349 | 12/1999 |

(Continued)

OTHER PUBLICATIONS

Microsoft, Microsoft MapPoint FAQ, Dec. 2008 visited via Wayback Machine, www.microsoft.com/mappoint/en-us/faq.aspx.*

(Continued)

*Primary Examiner* — Thomas Black
*Assistant Examiner* — Sara Lewandroski
(74) *Attorney, Agent, or Firm* — H.C. Park & Associates, PLC

(57) ABSTRACT

The present invention relates to apparatus and method for road guidance using a mobile terminal. The method for road guidance using a mobile terminal includes receiving a map image created by a users input, setting at least one user-designated location to the map image according to the users input, setting location information of the user-designated location to the user-designated location, comparing the location information of the user-designated location with current location information of the mobile terminal; and notifying of arrival at the user-designated location. A user may arrive at a desired destination according to the present invention without using map data provided by a map data service provider.

18 Claims, 12 Drawing Sheets

(56) References Cited

U.S. PATENT DOCUMENTS

| | | | | |
|---|---|---|---|---|
| 2008/0243374 A1* | 10/2008 | Hatazawa | ................... | 701/208 |
| 2008/0313563 A1* | 12/2008 | Yun | ................... | 715/810 |
| 2009/0109216 A1* | 4/2009 | Uetabira | ................... | 345/419 |
| 2011/0214047 A1* | 9/2011 | Pilskalns | ................... | 715/205 |

FOREIGN PATENT DOCUMENTS

| | | |
|---|---|---|
| JP | 2002-098535 | 4/2002 |
| JP | 2007-205889 | 8/2007 |
| JP | 2008-209140 | 9/2008 |
| WO | 2007-100632 | 9/2007 |

OTHER PUBLICATIONS

Microsoft, Microsoft MapPoint for Small Business, Dec. 2008 visited via Wayback Machine, www.microsoft.com/mappoint/en-us/SmallBiz.aspx.*

Abeshouse et al., Scavenger Hunt and Puzzle Environment, Spring 2007, Urban Nomad.*

European Search Report of EP 10 15 0173 dated Feb. 21, 2012.

TOMTOM: "TomTom One", TomTom one manual, Jan. 1, 2008, pp. 1-57.

* cited by examiner

METHOD AND APPARATUS FOR ROAD GUIDANCE USING MOBILE TERMINAL

CROSS REFERENCE TO RELATED APPLICATION

This application claims priority from and the benefit of Korean Patent Application No. 10-2009-0001013, filed on Jan. 7, 2009, which is hereby incorporated by reference for all purposes as if fully set forth herein.

BACKGROUND OF THE INVENTION

1. Field of the Invention

Exemplary embodiments of the present invention relate to a method and apparatus for road guidance using a mobile terminal, and more particularly, to a method for road guidance using a map created by a user and an apparatus using the method.

2. Description of the Background

Electronic devices can provide a user with the convenience of mobility and a rich is set of services and features. Examples of services including various data transmission services and additional services as well as a voice communication service using electronic device such as multimedia communication device.

Additionally, many electronic devices today can include a Global Positioning System (GPS) receiver that may be implemented in a mobile terminal to provide a navigation service. Generally, the GPS receiver and map data are used to provide the navigation service in the mobile terminal, and the mobile terminal receives information about its current location through the GPS receiver and displays a map using the map data, thereby displaying the current location to the user.

However, map data that the user wants to use is typically only a portion of the map data stored in the mobile terminal, and the mobile terminal may provide the navigation service to the user by using only map data that is necessary for the user. The mobile terminal via a modem of a personal computer (PC) or wireless Internet to receive only the map data that is necessary and may store the map data. However a connection of a mobile terminal to the PC to receive the map data may be required a special port for connection and to follow a complicated connection process for the user, and time and fee associated problems are typically rendered, for example, in the case of downloading the map data through the wireless Internet, a data fee may be charged to the user and downloading time may be required. Additionally, a map provided by a map data service provider may include detailed information such as a specific road name and a name of building that may confuse the user to follow instructions.

Therefore, to be competitive, the manufacturers need to address ever growing requirement for convenient and advanced method and apparatus for providing a road guide service to the user without using the complicated map provided by the map data service provider.

SUMMARY OF THE INVENTION

Exemplary embodiments of the present invention provide a method and apparatus for providing a road guidance using a map created by a user.

Additional features of the invention will be set forth in the description which follows, and in part will be apparent from the description, or may be learned by practice of the invention.

Exemplary embodiments of the present invention disclose a method for providing road guidance. The method includes displaying a map image created by a user input. The method also includes setting at least one user-designated location to the map image according to the user's input. The method includes setting location information of the user-designated location to the user-designated location. The method also includes determining whether a current location information and the location information of the user-designated location is identical. And the method includes notifying of arrival at the user-designated location.

Exemplary embodiments of the present invention disclose a terminal capable of providing road guidance. The terminal includes a Global Positioning System (GPS) module configured to receive a Global Positioning System (GPS) signal to set current location data. The terminal also includes a touch sensor unit to detect a user input and a display unit to display a map image and a user-designated location data created according to the user input. The terminal includes a controller to set a location data to the user-designated location data, and to create the map image. The terminal includes a storage unit to store the map image.

Exemplary embodiments of the present invention disclose an apparatus using a key input unit and display unit to provide road guidance. The apparatus includes a processor is configured to detect a map image triggering event based on a user input. The processor further configured to generate location data of a user-designated location and the location data is set to the map image in response to detection of the map image triggering event created by the user input. The apparatus also includes a mapping table, coupled to the processor, configured to determine whether a current location data and the location data of the user-designated location is identical, wherein an arrival notice is provided.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
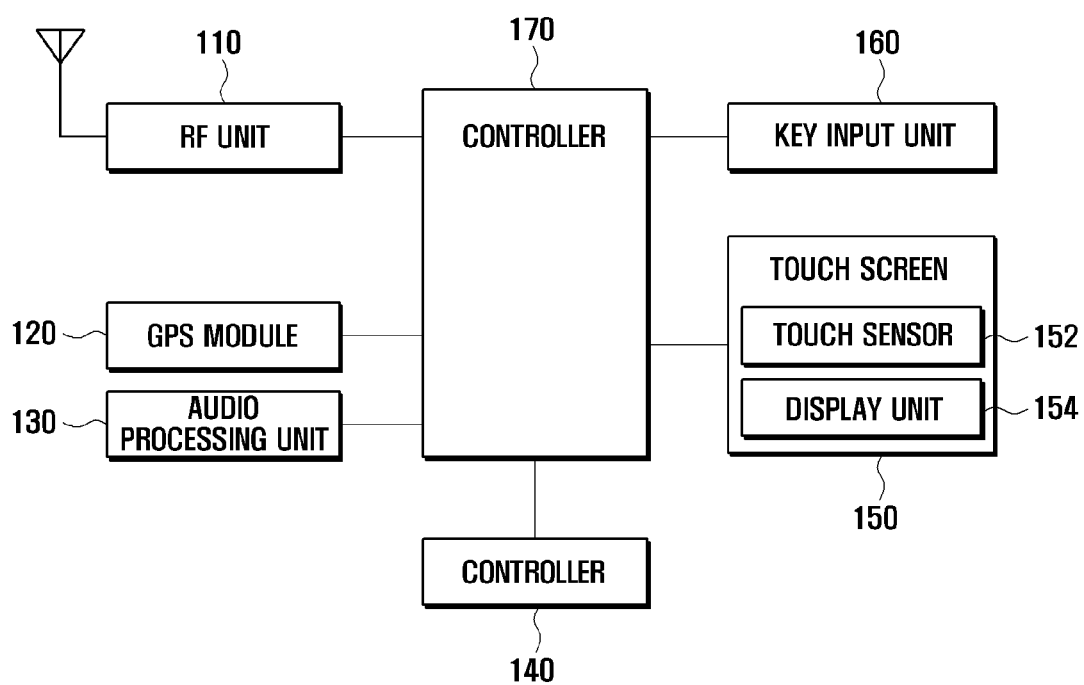
FIG. 1 is a diagram of a computer system that can be used to implement various exemplary embodiments, according to exemplary embodiments of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

In the following description, for the purposes of explanation, numerous specific details are set forth in order to provide a thorough understanding of the present invention. It is apparent, however, to one skilled in the art that the various exemplary embodiments may be practiced without these specific details or with an equivalent arrangement. In other instances, well-known structures and devices are shown in block diagram form in order to avoid unnecessarily obscuring the exemplary embodiments. The terms used in the following descriptions are defined in consideration of the corresponding functions in the present invention and thus can be replaced with other terms according to the intention and practice of a user and an operator.

A "road guide map" is map data that a user can create. A menu for creating a map image can be included in the mobile terminal, and the user may create the map image using a touch screen or key pad. The mobile terminal may display, for example, a line image, and a dot image according to the user's input, and may create a map image by combining the line image and the dot image. The mobile terminal may display at least one user-designated location input by the user on a map image created by the user, and the user may set (e.g., affix, determine, identify or map) location information to the user-designated location. The mobile terminal may create a road guide map including the map image, user-designated location and location information that correspond to the user-designated location.

A "user-designated location" is a specific location that can be set on the map image created by the user, and may include a destination and one or more intermediate locations. Location information can be set to each user-designated location in some exemplary embodiments of the present invention.

The mobile terminal according to exemplary embodiments of the present invention may be a terminal having a GPS module, and may be an information communication device such as a mobile communication terminal, a portable multimedia player, a personal digital assistant, a smart phone, an MPEG-1 Audio Layer III (MP) player and a multimedia device, and applications associated with terminals.

FIG. 1 is a diagram of a hardware that can be used to implement various exemplary embodiments, according to exemplary embodiments of the present invention.

As shown in FIG. 1, a radio frequency (RF) unit 110 may transmit and receive data signals for wireless communication of the mobile terminal. The RF unit 110 may include an RF transmitter configured to upconvert and to amplify signals to be transmitted, and an RF receiver is configured to gain low-noise amplified and downconverted signals. Further, the RF unit 110 may receive data signals through wireless network channels, may output the data signals to a controller 170, and may transmit data signals transmitted from the controller 170 via wireless channels.

A Global Positioning System (GPS) module 120 may receive GPS satellite signals from a GPS satellite. The GPS module 120 may include a high-frequency unit and a signal processing unit. In some examples, the high-frequency unit may convert signals ranging from 1.2 GHz and 1.5 GHz received from an antenna into low frequency signals. The signal processing unit may decode spread spectrum to obtain a message and pseudo range from the satellite. The GPS module 120 may receive information about a current location of the mobile terminal using GPS satellite signals transmitted from the GPS satellite and may output the is location information to the controller 170.

According to exemplary embodiments of the invention, execution of the instructions contained in the storage unit (not shown) may cause the processor to perform processes according to the instructions. The controller 170 may include one or more processors in a multi-processing arrangement to execute the instructions contained in storage unit. Hard-wired circuitry may be used in place of, or in combination with, software instructions to implement one or more of the exemplary embodiments of the present invention. For example, reconfigurable hardware, such as Field Programmable Gate Arrays (FPGAs), can be used, and functionality and connection topology of the FPGA logic gates may be customized at run-time, typically by programming memory look up tables. Thus, exemplary embodiments of the present invention are not limited to any specific combination of hardware circuitry and/or software.

A "computer-readable medium" may refer to any medium that provides instructions to the processor for execution. Such a medium may be implemented in various forms, including but not limited to, non-volatile media, volatile media, and transmission media. Non-volatile media may include, for example, optical or magnetic disks, such as the storage device. Volatile media may include dynamic memory, such as main memory. Transmission media may include coaxial cables, copper wire and fiber optics, including the wires that comprise the bus. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other suitable magnetic medium, a compact disk read-only memory (CD-ROM), compact disc rewritable (CDRW), digital video disc (DVD), any other suitable optical medium, punch cards, optical mark sheets, any other is suitable physical medium with patterns of holes or other optically recognizable indicia, a random-access memory (RAM), a programmable read-only memory (PROM), and erasable programmable read-only memory (EPROM), a FLASH-EPROM, any other memory chip or cartridge, and a carrier wave.

Various forms of computer-readable media may be involved in providing instructions to a processor for execution. For example, the instructions for carrying out at least part of the present invention may be implemented on a magnetic disk of a remote computer. The remote mobile terminal may load the instructions into the storage unit and may send the instructions, for example, over a telephone line using a modem. A modem of a local system may receive the data on a telephone line and/or may be used an infrared transmitter to convert the data to an infrared signal and may transmit the infrared signal to the electronic appliance (e.g., mobile terminal). The electronic device may receive information and instructions provided by the infrared signal. The bus may provide the information and instructions to the storage unit from which a processor may retrieve and execute the instructions. The instructions received by storage unit may optionally be stored either before or after execution by the controller 170.

An audio processing unit 130 may include a codec that may include a data codec for processing packet data and an audio codec for processing audio signals. The audio processing unit 130 may convert, using the audio codec, digital audio signals to analog audio signals, and analog audio signals input from a microphone to digital audio signals. The audio processing unit 130 may also reproduce the signals generated by a speaker. When the current location of the mobile terminal is within a range of the user-designated location, the audio processing unit 130 may output an audible sound to indicate that the user has arrived at the location.

A storage unit 140 may store programs and data necessary for the operation of the mobile terminal, and may include a program area and data area. The storage unit 140 may store a road guide map created by the user. The storage unit 140 may store map image data, data about user-designated locations, and data about location information corresponding to the user-designated locations as data for the road guide map. The storage unit 140 may store a location information list. The storage unit 140 may store location names and location information (e.g., latitude, longitude, and address) corresponding to the respective location names as data in the location information list. If the location information list is in a text data format, data about the location information list may require minimal capacity of the storage unit 140, and therefore a storage medium having a large capacity may not be required.

A touch screen 150 may include a touch sensor 152 and a display unit 154. The touch sensor 152 may detect whether a touching means touches the touch screen 150. The touching means may be applied by a user's hand or a touch tool, for example, a stylus pen. The touch sensor 152 may be an electric capacity touch detection sensor or a pressure sensor, however, it is not limited thereto and may be any sensor that may detect contact by an object or pressure thereof.

The touch sensor 152 may be deployed at a front surface or side surface of the mobile terminal, and may operate as an input unit of the mobile terminal. The touch sensor 152 may detect the user's input to the touch screen 150, may generate an input detection signal and may output the signal to the controller 170. The input detection signal may include location information input by the user. The touch sensor 152 may detect the user's input for creating the road guide map. If the touch sensor 152 detects the user's input, it may generate a detection signal and may output the signal to the controller 170, and the controller 170 may display a map image on the display unit 154 based on the detection signal output from the touch sensor 152.

The display unit 154 may include a liquid crystal display device, and may display menus, input data, function-setting information and various other information of the mobile terminal to the user. For example, the display unit 154 may output a booting screen, a standby screen, a display screen, a communication screen, or other types of application screens. The display unit 154 may display the road guide map created by the user by a controller 170 configured to control functions of the display unit 154. Additionally, when a current location of the mobile terminal is within a range of the user-designated location, the display unit 154 may display an arrival notice image indicating that the user has arrived at the location.

A key input unit 160 may receive a key operation signal from the user to control the mobile terminal and may output the signal to the controller 170. The key input unit 160 may be a key pad including function keys, numeral keys and direction keys, and may be configured a side of the mobile terminal. In the case of a mobile terminal that is operable only with the touch sensor 152, the key input unit 160 may be omitted by way of configuration. In some exemplary embodiments of the present invention, the key input unit 160 may generate signals for creating the road guide map according to the user input.

The controller 170 may control overall operation of the mobile terminal. The controller 170 may control the touch sensor 152 and key input unit 160 to receive input signals and may display a map image and user-designated location on the display unit 154. Additionally, the controller 170 may create the road guide map by setting location information to the user-designated location, and may store the created road guide map in the storage unit 140. The controller 170 may control the GPS module 120 to receive information about a current location of the mobile terminal, may calculate the current location of the mobile terminal from the received current location information, and may determine whether the current location of the is mobile terminal is within a range of a user-designated location as set in the road guide map. When the current location of the mobile terminal is within a range of at least one of the user-designated location, the controller 170 may control the display unit 154 to display an arrival notice image indicating that the user has arrived at the location.

The mobile terminal may include a vibration generation unit. The vibration generation unit may generate vibration by the controller 170 to control functions of the vibrations generation unit. The vibration generation unit may include a vibration motor that generates vibration by the rotation of an eccentric rotor. When the current location of the mobile terminal is within a range of at least one of the user-designated location, the vibration generation unit may output vibration indicating that the user has arrived at the location.

A road guidance method according to exemplary embodiments of the present invention is described hereinafter. The road guidance method is described in detail with a road guide map creation process and a road guidance process.

Figure 2:
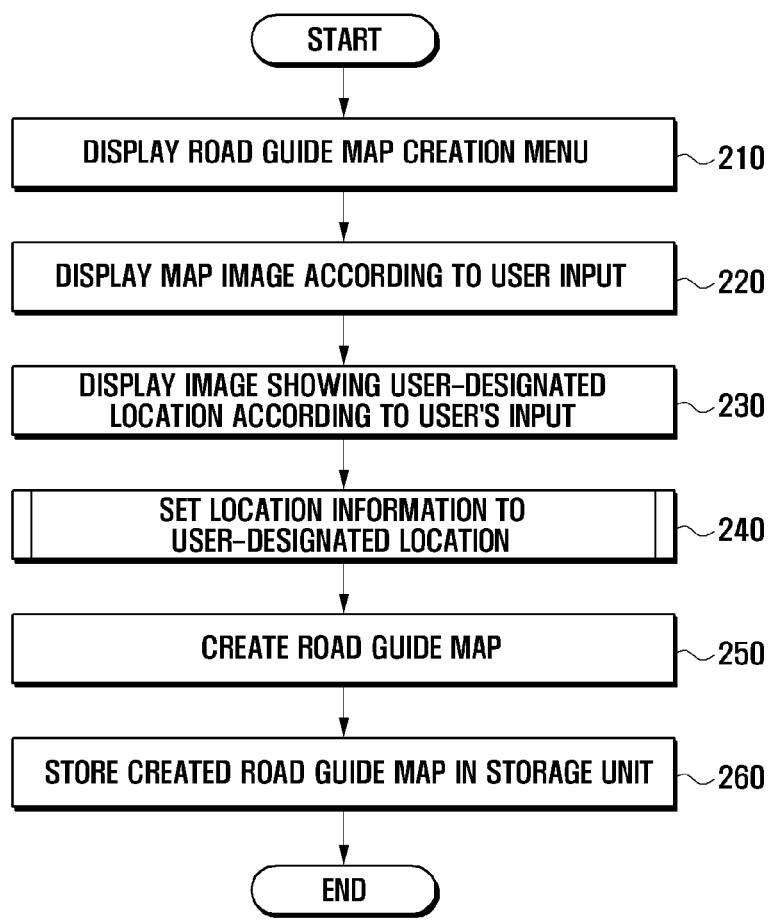
FIG. 2 is a flowchart of a process for creating a road guide map based on road guidance, according to exemplary embodiments of the present invention.

FIG. 2 is a flowchart of a process for creating a road guide map based on road guidance according to exemplary embodiments of the present invention.

As in step 210, when a user inputs a menu selection command to create a road guide map, the controller 170 may control functions of the display unit 154 to display a road guide map creation menu. The user may select a menu to write a memo for creating a map, and, if the user inputs a menu selection command to write a memo, the controller 170 may control the display unit 154 to display the menu for writing a memo. Additionally, the memo writing can be performed in a standby screen mode according to the user set-up (e.g., user settings), the controller 170 may maintain display of the standby screen of the display unit 154 while awaiting the user input. For example, lower level menus may be included in the road guide map creation menu to create a new map or to edit a map stored in the storage unit. For the purpose of the illustration, it is assumed that the user may select a lower level menu to create a new map. According to exemplary embodiments, a process for creating a road guide map is described as follows.

Figure 5A:
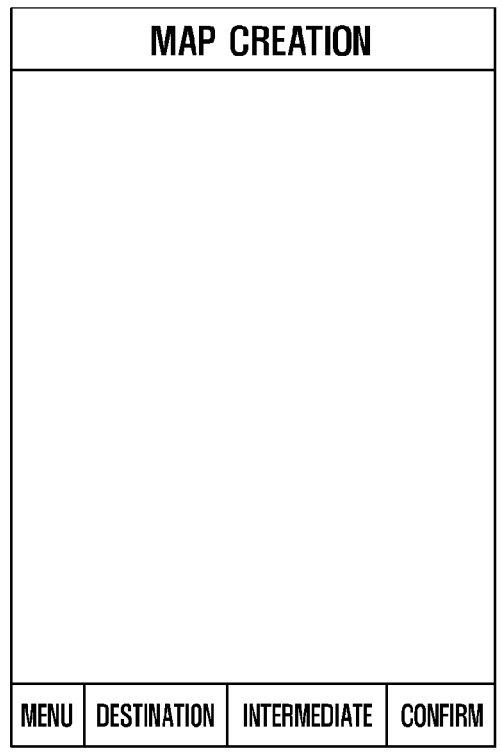
FIG. 5A is a display screen view illustrating the process for creating a road guide map of FIG. 2, according to exemplary embodiments of the present invention.

FIG. 5A is a display screen view illustrating the process of creating a road guide map of FIG. 2. If the user inputs a touch or drawing action applied on the display screen, the controller 170, per step 220, may control the display unit 154 to display a map image according to the user input. Drawing tools may be included in the road guide map creation menu according to exemplary embodiments of the present invention. The user may select the thickness and shape of lines using the drawing tools, and may select tools such as an eraser, and drawing functions such as painting, brushing and figure drawing. A menu key may be installed at a lower end of the display screen in FIG. 5A, and the user may select the drawing tools by selecting the menu key.

Figure 5B:
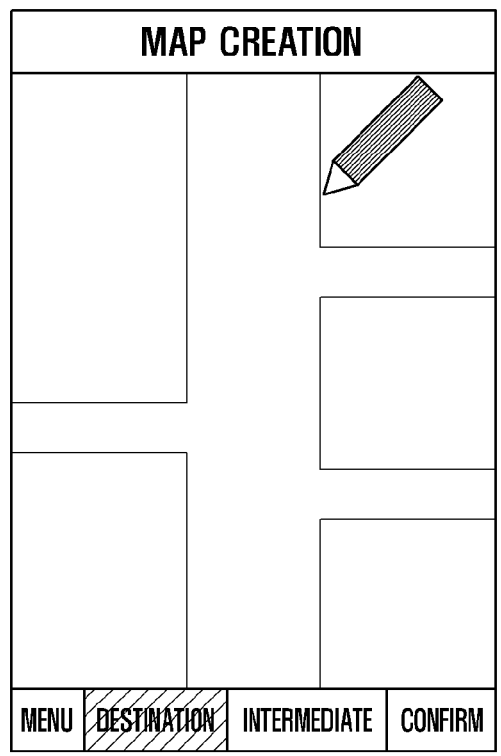
FIG. 5B is a display screen view illustrating the process for creating a road guide map of FIG. 2, according to exemplary embodiments of the present invention.

FIG. 5B is a display screen view showing a map image created by the user. When the user draws a road on the touch screen, a road image can be displayed as exemplarily shown in FIG. 5B. The user may draw images such as a building image or a bridge image as well as a road image as the map image.

Figure 5C:
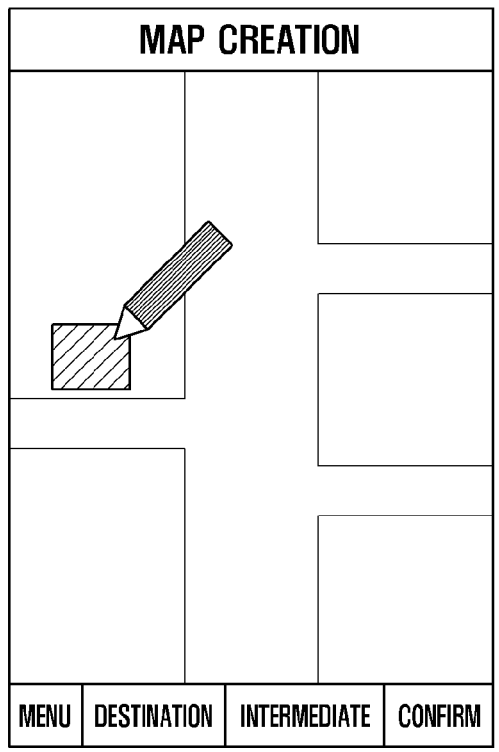
FIG. 5C is a display screen view illustrating the process for creating a road guide map of FIG. 2, according to exemplary embodiments of the present invention.

When the user completes the map image creation and inputs a command to set at least one user-designated location on the map image, the controller 170, in step 230, may control the display unit 154 to display an image showing the user-designated location according to the user input. The user-designated location according to exemplary embodiments of the present invention may correspond to a destination or an intermediate location. FIG. 5C is a display screen view showing a destination image as the user-designated location. After completion of the map image creation, the user can input a "Destination" key at the bottom of the display screen and then can touch an area on the map image to set a destination. The controller 170 may identify the touched area from a detection signal received from the touch sensor 152, and may control the display unit 154 to display a destination image at the touched area. A square shaped block shown in FIG. 5C corresponds to the destination image.

After displaying an image showing the user-designated location on the display unit 154, in step 240, the controller 170 may set location information to the user-designated location. When the user inputs the "Destination" key and touches an area to be set as a destination, the controller 170 may promptly display a location information setting menu without displaying a destination image on the corresponding area and may set location information of the destination according to the user input. Alternatively, the controller 170 may first control the display unit 154 to display the destination image at an area to be set as the destination according to the user input, and when the user touches the destination image, the controller 170 may then control the display unit 154 to display a location information setting menu and set location information of the destination according to the user input. While the display unit 154 displaying the destination image, if the user touches an "Intermediate" key and an area to be set as an intermediate location, the controller 170 may control the display unit 154 to display an intermediate location image at the corresponding area. If the user touches an image in a state that both the destination image and intermediate location image are displayed, the controller 170 may control the display unit 154 to display the location information setting menu to set location information of the touched image according to the user input.

The user may set location information corresponding to the user-designated location by searching for location information through a search word input, or may set location information by identifying a current location.

Figure 5D:
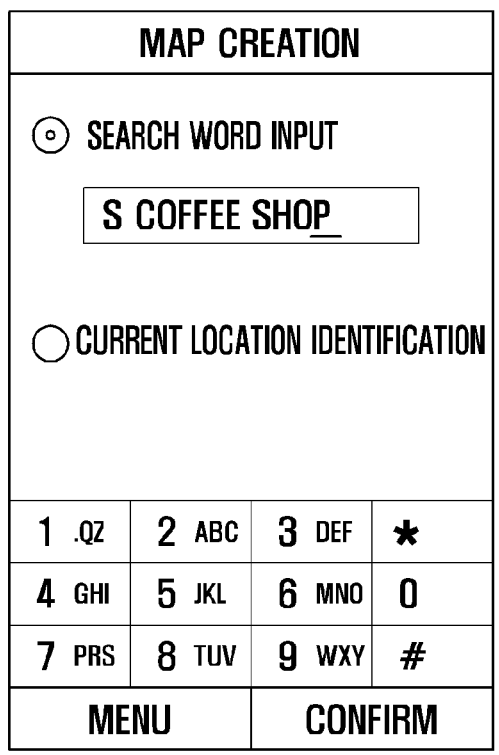
FIG. 5D is a display screen view illustrating location information setting menu in the process of creating a road guide map of FIG. 2, according to exemplary embodiments of the present invention.

FIG. 5D is a display screen view showing a location information setting menu. For example, two menu options of "Search Word Input" and "Current Location Identification" are shown in FIG. 5D. The user may set location information by using at least one menu option. Setting location information by input search word is described in detail later with reference to FIG. 3A, and setting location information by current location identification is described in detail later with reference to FIG. 3B.

Figure 5E:
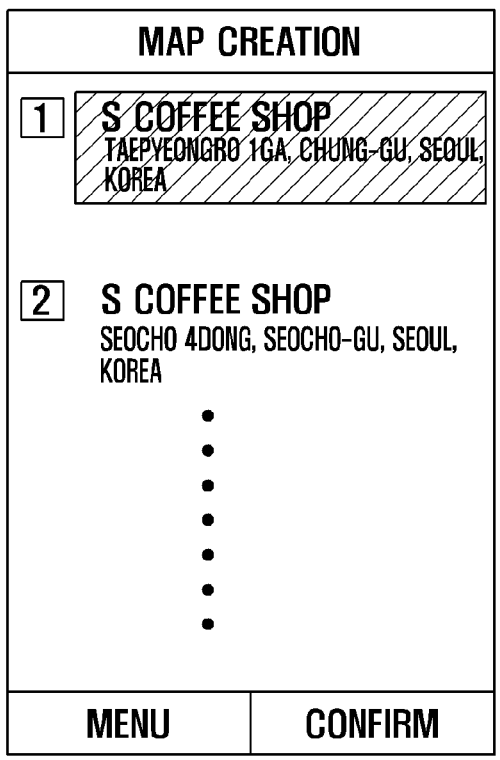
FIG. 5E is a display screen view illustrating location information corresponding to an input search word from plurality of locations in the process of creating a road guide map of FIG. 2, according to exemplary embodiments of the present invention.

The controller 170, in step 250, may create a road guide map including a map image, at least one user-designated location, and location information corresponding to the user-designated location. FIG. 5H is a display screen view showing a created road guide map. "S Coffee Shop" can be displayed as a destination, and "W Bank" and "City Hall Station" can be displayed as intermediate locations. A rectangular block may be displayed at "S COFFEE SHOP" as indicating a destination image, circular blocks are displayed at "W Bank" and "City Hall Station" as indicating intermediate location images, and location information (e.g., latitude and longitude values) is set to "S Coffee Shop", "W Bank" and "City Hall Station."

After the controller 170 creates the road guide map, in step 260, the controller 170 may store the road guide map created by the user in the storage unit 140. In storing the road guide map, the controller 170 may control the display unit 154 to display a window for inputting a name of the road guide map. When the user inputs a name of a road guide map, the controller 170 processes to match the input name of the road guide map to the road guide map and to store the data in the storage unit 140. Map image data, user-designated location data and location information data corresponding to the user-designated location may be stored as data for the road guide map.

Figure 3A:
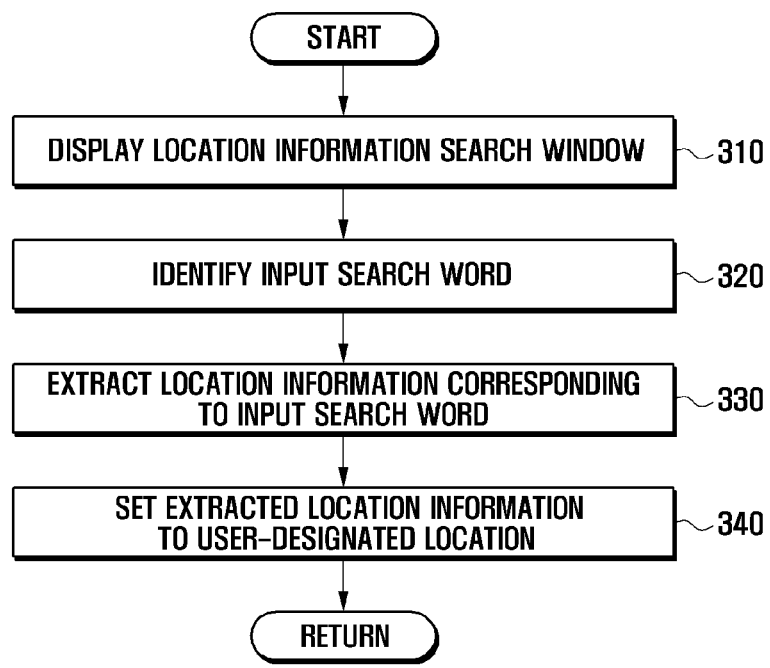
FIG. 3A is a flowchart of a process for setting location information according to an input search word for creating a road guide map, according to exemplary embodiments of the present invention.

FIG. 3A is a flowchart of a process for setting location information according to a input search word for creating a road guide map, per step 240 of FIG. 2. The storage unit 140 may store a preset (e.g., predetermined) location information list. The location information list may be created by, for example, the user input, or created from data received from a location information provider.

Referring to FIG. 3A, the controller 170, per step 310, may control the display unit 154 to display a location information search window. The location information search window can be displayed on the display screen shown in FIG. 5D, at the menu option "Search Word Input". The user may input a search word at the location information search window using the touch screen 150 or key input unit 160, and the controller 170. As in step 320, a user may identify the input search word. When the user confirms completion of input of the search word, the controller 170, per step 330, may extract location information corresponding to the input search word from the location information list stored in the storage unit 140.

In the display screen shown in FIG. 5D, the user may input "S Coffee Shop" as a search word. The controller 170 may extract location information of "S coffee shop" from the storage unit 140. If location information of a plurality of "S coffee shops" is stored in the storage unit 140, the controller 170 may control the display unit 154 to display the location information of all "S coffee shops". FIG. 5E is a display screen view showing location information of a plurality of "S coffee shops". In FIG. 5E, names and addresses corresponding to "S coffee shops" are enumerated, for example, "S coffee shop, Taepyeongro 1ga, Chung-gu, Seoul, Korea" and "S coffee shop, Seocho 4dong, Seocho-gu, Seoul, Korea". The user may select location information of a desired "S coffee shop" from the displayed addresses of the plurality of "S coffee shops."

Figure 5F:
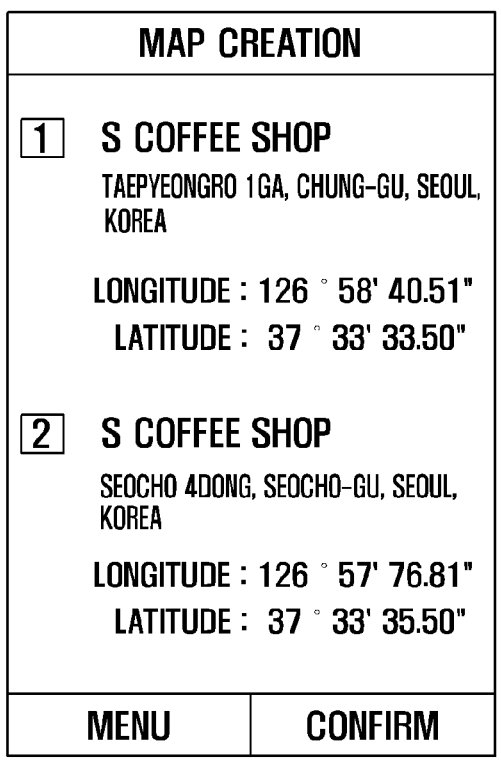
FIG. 5F is a display screen view illustrating location information corresponding to an input search word from plurality of locations in the process of creating a road guide map of FIG. 2, according to exemplary embodiments of the present invention.

FIG. 5F is a display screen view showing location information of a plurality of "S coffee shops" as a result of a location information search, in a different form than that of FIG. 5E. In FIG. 5F, latitude and longitude values may be displayed as well as names and addresses. When an address in a large regional area such as "Taepyeongro 1ga, Chung-gu, Seoul, Korea" is displayed, a plurality of user-designated locations may be found within the region. For example, a plurality of "S coffee shops" having the address "Taepyeongro 1ga, Chung-gu, Seoul, Korea" may exist. In this example, the display unit 154 may display latitude and longitude values as well as names and addresses, the user may set location information more precisely.

The controller 170, in step 340, may set location information extracted from the storage unit 140 to the user-designated location. The location information set, in step 340, includes a name, latitude and longitude. The road guide map creation process then may continue per step 250 of FIG. 2. The controller 170 may create a road guide map including a map image, at least one user-designated location and location information set to the user-designated location.

Figure 5G:
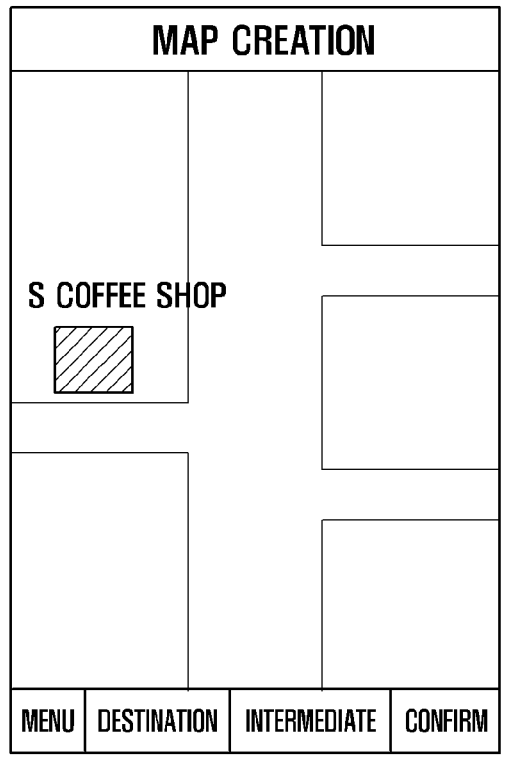
FIG. 5G is a display screen view illustrating location information set to a location designated by the user in the process of creating a road guide map of FIG. 2, according to exemplary embodiments of the present invention.
Figure 5H:
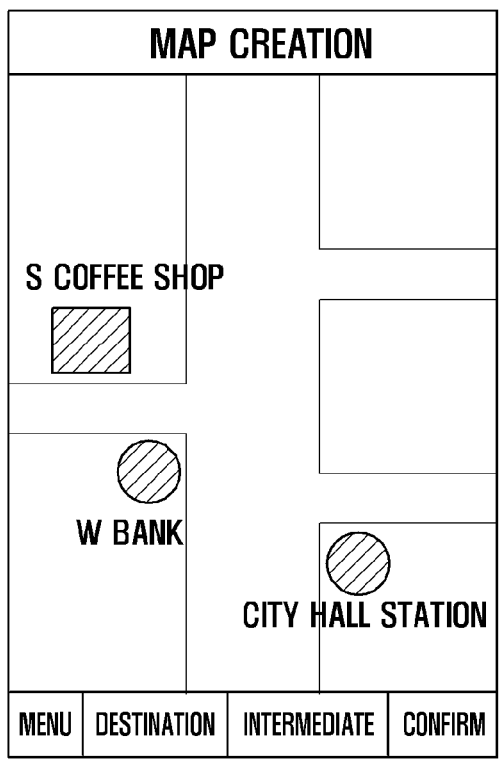
FIG. 5H is a display screen view illustrating a road created according to guide is map in the process of creating a road guide map of FIG. 2, according to exemplary embodiments of the present invention.

FIG. 5G is a display screen showing location information set to a location designated by the user. In FIG. 5G, the destination image and name of "S Coffee Shop" are displayed, to which latitude and longitude information is set.

Figure 3B:
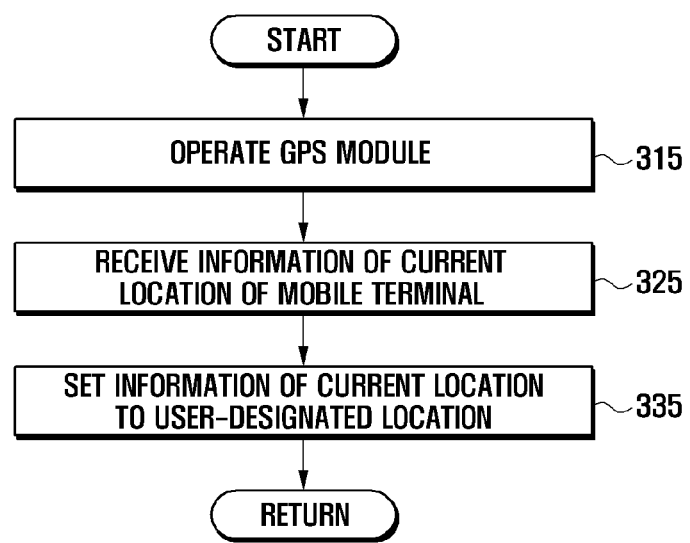
FIG. 3B is a flowchart of a process for setting location information based on current location identification for creating a road guide map, according to exemplary embodiments of the present invention.

FIG. 3B is a flowchart of a process for setting location information based on current location identification, per step, 240 of FIG. 2. Location information of a current location of the mobile terminal is set to a user-designated location. For the purpose of the illustration, it is assumed that the user is presently located at the location at which the user may want to set location information before setting the location information to the user-designated location.

Referring to FIG. 3B, the user may select "Current Location Identification" in the menu displayed on the screen of FIG. 5D, and the controller 170, in step 315, may operate the GPS module 120. The controller 170, in step 325, may receive information of the current location of the mobile terminal by controlling the GPS module 120. Because the user is located in an area at which the user wants to set as location information, information about the current location of the mobile terminal can be identified by GPS signals, which corresponds to location information to be set. The controller 170, in step 335, may set the location information of the current location to the user-designated location.

Figure 6A:
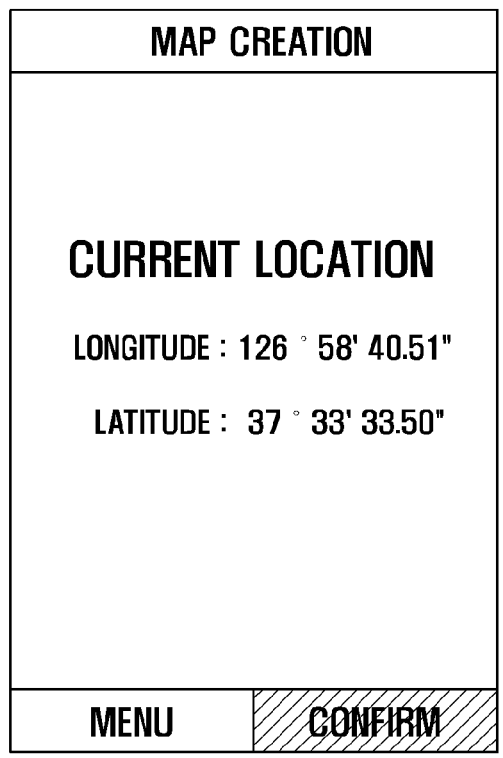
FIG. 6A is a display screen view illustrating information associated with a current location of the mobile terminal in the process of creating a road guide map of FIG. 2, according to exemplary embodiments of the present invention.
Figure 6B:
FIG. 6B is a display screen view illustrating a window for inputting a name of a user-designated location in the process of creating a road guide map of FIG. 2, according to exemplary embodiments of the present invention.

FIG. 6A is a display screen view showing a current location of the mobile terminal. If the user touches a "Confirm" key shown in FIG. 6A, the controller 170 may control the display unit 154 to display a window for inputting a name of the user-designated location, as shown in FIG. 6B. When the user inputs "S Coffee Shop" and touches the confirmation key, the controller 170 may create a road guide map as shown in FIG. 5G.

Some exemplary embodiments of the present invention may be applied in a case that location information that the user wants to set may not be stored in the storage unit 140. For the purpose of illustration, it is assumed that the user is presently located at an area that the user wants to set as location information. The user may start a location information setting operation by inputting a search word. The controller 170 may control the display unit 154 to display a location information search window and, when the user inputs a search word into the location information search window using the touch screen 150 or key input unit 160, the controller 170 may control the display unit 154 to display the search word. When the user confirms completion of input of the search word, the controller 170 may search location information corresponding to the input search word from the location information list stored in the storage unit 140. If location information corresponding to the input search word is not stored in the storage unit 140, the controller 170 may control the display unit 154 to display a message that location information corresponding to the search word is not stored. The controller 170 may operate the GPS module 120 to receive a GPS satellite signal and may determine information of the current location of the mobile terminal by the received signal. The controller 170 may set the determined information of the current location of the mobile terminal to the user-designated location.

According to exemplary embodiments of the present invention, the user may directly input latitude and longitude values to set location information which corresponds to a user-designated location. The user may input the latitude and longitude using units of degrees, minutes and seconds, and input units may vary according to setting of the mobile terminal. When the user inputs the latitude and longitude and touches a confirmation key, a name input window may be displayed as shown in FIG. 6B, and location information according to the user-designated location may be set by inputting a corresponding name.

According to exemplary embodiments of the present invention, the controller 170 may measure a distance between user-designated locations based on location information set to the user-designated locations, and may set at least one intermediate location based on the distance between user-designated location and the intermediate location. If the distance between each of the user-designated locations is too great to measure, the user may experience difficulty in finding a road. Accordingly, the controller 170 can measure the distance between each of the user-designated locations based on location information set to the user-designated locations, and if the distance is greater than a reference distance, the controller 170 may set at least one intermediate location.

Figure 5I:
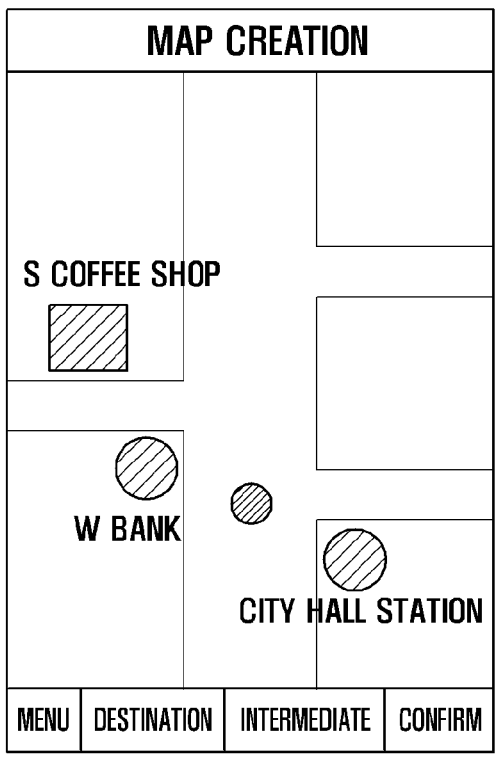
FIG. 5I is a display screen view illustrating a road guide map in which an intermediate location is set in the process of creating a road guide map of FIG. 2, according to exemplary embodiments of the present invention.

This operation is described here in detail with reference to FIG. 5H and FIG. 5I. In the display screen shown in FIG. 5H, "S Coffee Shop" is set as a destination, and "W Bank" and "City Hall Station" are set as intermediate locations. Location information is set to the destination and intermediate location, and the controller 170 may calculate the distance between the destination and intermediate location based on the location information. For the purpose of illustration, it is assumed that the distance between "S Coffee Shop" and "W Bank" is 200 m and the distance between "W Bank" and "City Hall station" is 1 km, and the reference distance is set as 500 m in the mobile terminal. As a calculation result, the controller 170 may identify that the distance between "S Coffee Shop" and "W Bank" is 200 m, which is less than the reference distance 500 m, and that the distance between "W Bank" and "City Hall Station" is 1 km, which is greater than the reference distance 500 m. The controller 170, based on a distance scale information, may display an image representing an additional intermediate location between "W Bank" and "City Ball Station" and may set location information to the additional intermediate location. FIG. 5I is a display screen view showing a road guide map in which an additional intermediate location is set. In FIG. 5I, an image of an intermediate location is newly displayed between "W Bank" and "City Hall Station". The controller 170 may calculate location information of the intermediate location between "W Bank" and City Hall Station" and may set the calculated location information to the intermediate location.

Figure 4:
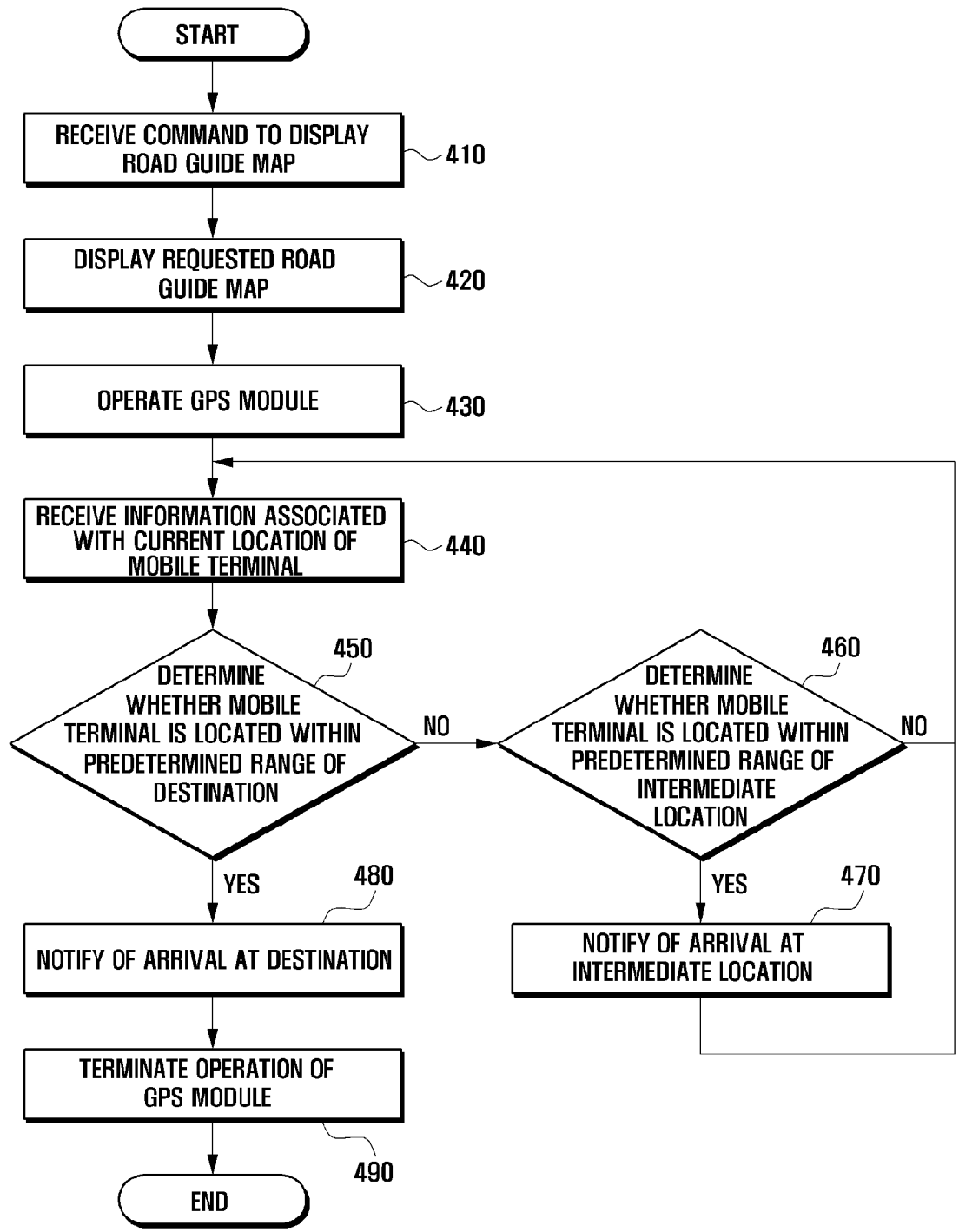
FIG. 4 is a flowchart of a process for illustrating a road guidance, according to exemplary embodiments of the present invention.

FIG. 4 is a flowchart of a process for illustrating a road guidance, according to exemplary embodiments of the present invention.

Referring to FIG. 4, the controller 170, in step 410, may receive a command input by a user to display a road guide map. The user may select the command to display a road guide map from a menu for a road guide function displayed on the display unit 154. At least one road guide map can be stored in the storage unit 140, and the user may display a desired road guide map using a name of the road guide map stored corresponding to the road guide map. The controller 170, in step 420, may control the display unit 154 to display the requested road guide map. The controller 170, in step 430, may operate the GPS module 120. The controller 170 may already be operating the GPS module 120 before displaying the road guide map on the display unit 154. The controller 170, in step 440, may control the GPS module 120 to receive information associated with a current location of the mobile terminal. The controller 170, in step 450, may determine whether the mobile terminal is located within a range of the destination using information about the current location of the mobile terminal.

According to exemplary embodiments of the present invention, the controller 170 may compare location information of the current location of the mobile terminal received from the GPS module 120 with location information set to the user-designated location to determine whether the current location and the user-designated location are identical, and to determine whether the mobile terminal is located within a range of the user-designated location. In this example, the range may be a reference distance set in the mobile terminal, and may be set by the user. In exemplary embodiments of the present invention, the range (e.g., distance scale) may preferably be set to a distance from the user-designated location from which the user may recognize that he has arrived at the user-designated location.

The location information may be set as latitude and longitude values in units of degrees, minutes and seconds.

If the mobile terminal is not located within a range of the destination, per step 450, the controller 170, in step 460, may determine whether the mobile terminal is located within a range of an intermediate location. If the mobile terminal is not located within a range of an intermediate location, the process may returns to step 440 and the controller 170 may continue to receive information from the GPS module 120 about the current location of the mobile terminal. If the mobile terminal is located within a range of an intermediate location, the controller 170, in step 470, may control the display unit 154 to display an arrival notice image indicating that the user has arrived at the intermediate location.

Figure 7A:
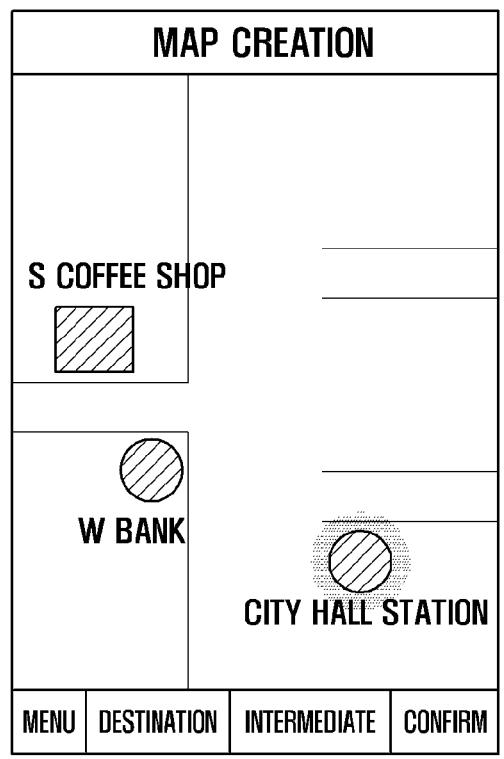
FIG. 7A and FIG. 7B are display screen views illustrating a road guide map when the user has arrived at an intermediate location in the process of road guidance of FIG. 4, according to exemplary embodiments of the present invention.
Figure 7B:
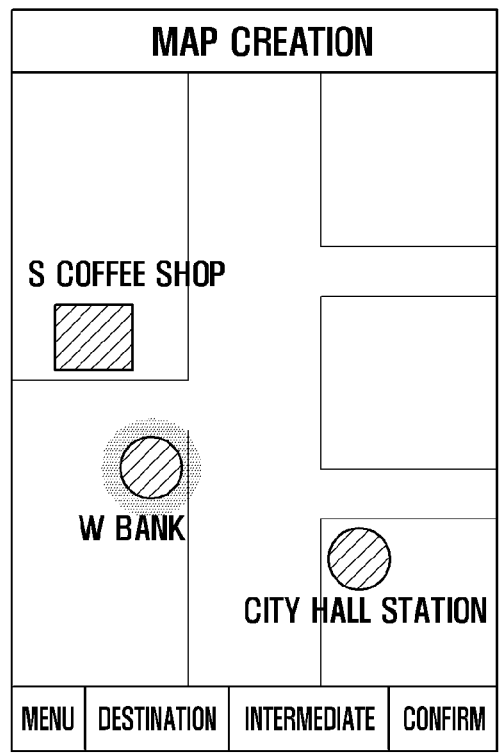

FIG. 7A and FIG. 7B are display screen views illustrating a road guide maps when the user has arrived at an intermediate location.

For example, FIG. 7A is a display screen view showing a road guide map when the user has arrived at the intermediate location "City Hall Station", and FIG. 7B is a display screen view showing a road guide map when the user has arrived at the intermediate location "W Bank". The controller 170 may control the display unit 154 to display the intermediate location image of "City Hall Station" or "W Bank" in a form that may be a distinguishable point from other intermediate location images, for example, by displaying the image in a large size or as a blinking image. Additionally, the controller 170 may control the display unit 154 to display the intermediate location image of "City Hall Station" or "W Bank" together with a message of "Current location" or "Here".

According to exemplary embodiments of the present invention, when the mobile terminal is located within a range of the user-designated location, the controller 170 may control the audio processing unit 130 or vibration generation unit to output an audible signal or vibration. As such, the user may identify a current location by output of the display unit 154, audio processing unit 130, or vibration generation unit.

Figure 7C:
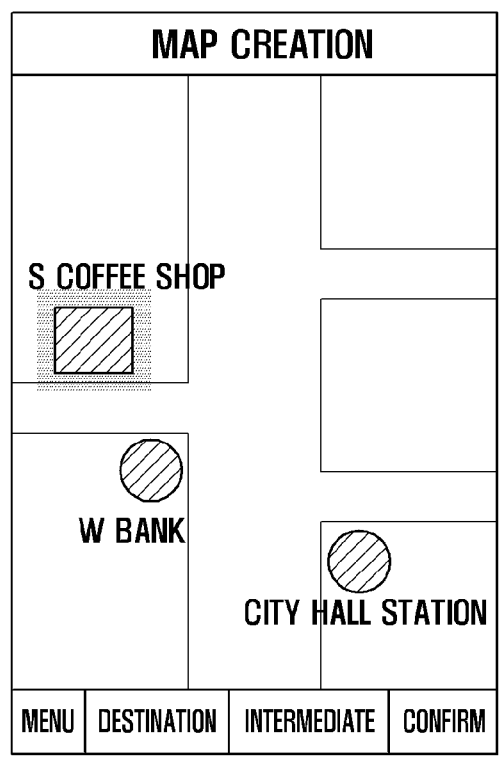
FIG. 7C is a display screen view illustrating a road guide map when the user arrives at a destination in the process of road guidance of FIG. 4, according to exemplary embodiments of the present invention.

If the controller 170 determines that the mobile terminal is located within a range of the destination, per step 450, the controller 170, in step 480, may control the display unit 154 to display an arrival notice image indicating that the user has arrived at the destination. FIG. 7C is a display screen showing a road guide map when the user has arrived at the destination "S Coffee Shop". A method for indicating that the user has arrived at the destination may be the same as the method for notifying that the user has arrived at an intermediate location, and the controller 170 may operate at least one of the display unit 154, audio processing unit 130, and vibration generation unit (not shown) to indicate that the user has arrived at the destination. When the mobile terminal is located within a range of the destination after indicating that the user has arrived at the destination, the controller 170, in step 490, may terminate the operation of the GPS module 120 and the road guidance process.

The user may arrive at a desired destination according to exemplary embodiments of the present invention without using map data provided by a map data service provider. Because only essential information for arriving at the destination is included in a road guide map created by the user, the user may easily find the destination. Additionally, because the user directly creates the road guide map, a unique user interface may be provided. The user may also upload a road guide map created by the user on a web site or send the road guide map to other users.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for providing location information of a terminal, comprising:
   receiving, via a user input, an input comprising a map image and a selection of a designated location;
   displaying the map image;
   setting the designated location to the map image according to the selection of the designated location;
   setting location information selected via input of a search query to the designated location set to the map image, the location information comprising actual geographic location information received in response to the input of the search query;
   determining whether a current location of the terminal and the location information are identical; and
   providing an alert in response to arriving at the designated location in response to determining that the current location of the terminal and the location information are identical.

2. The method of claim 1, wherein determining whether the current location of the terminal and the location information are identical comprises:
   receiving the current location of the terminal;
   comparing the current location of the terminal with the location information; and
   determining whether the current location is within a threshold range of the location information.

3. The method of claim 1, wherein the designated location comprises a destination location and an intermediate location.

4. The method of claim 1, wherein setting the location information to the designated location comprises:
   displaying a location information search window for the designated location;
   extracting, in response to receiving an input search word in the location information search window, location information corresponding to the input search word; and
   setting the extracted location information to the designated location.

5. The method of claim 1, wherein setting the location information to the designated location comprises:
   receiving current location information of the terminal; and
   setting the received current location of the terminal to the designated location.

6. The method of claim 1, wherein, if the designated location comprises at least a first designated location and a second designated location, setting the location information to the designated location further comprises:
   calculating a distance between the first designated location and the second designated location based on location information set to the first designated location and the second designated location;
   displaying, in response to determining that the distance between the first designated location and the second designated location is greater than a threshold distance, at least one intermediate location on the map image; and
   setting the location information to the at least one intermediate location.

7. The method of claim 3, wherein providing the alert in response to arriving at the designated location comprises:
   displaying, in response to determining that the current location of the terminal is within a threshold range of the intermediate location, an intermediate destination arrival notice image on the intermediate location of the map image, and receiving current location of the terminal; and
   displaying, in response to determining that the current location of the mobile terminal is within a threshold range of the destination location, a destination arrival notice image on the destination location of the map image.

8. The method of claim 1, wherein providing the alert in response to arriving at the designated location comprises outputting a sound and a vibration.

9. The method of claim 1, wherein setting the location information to the designated location comprises:
   displaying a location information search window for the designated location;
   searching for, in response to receiving an input search word, location information corresponding to the input search word;
   receiving, in response to determining that the location information corresponding to the input search word is not stored, current location of the terminal; and
   setting the received current location of the terminal to the designated location.

10. A terminal for providing location information, comprising:
    a Global Positioning System (GPS) module to receive a Global Positioning System (GPS) signal to set current location data;
    an input unit to receive an input comprising a map image and a selection of a designated location;
    a display unit to display the map image and a designated location data according to the input;
    a controller to set location data selected via input of a search query to the designated location data set to the map image and to create the map image comprising the designated location data, the location data comprising actual geographic location information received in response to the input of the search query; and
    a storage unit to store the map image.

11. The terminal of claim 10,
    wherein the controller is configured to control the Global Positioning System (GPS) module to receive the current location data, to compare the received current location data with the set location data of the designated location data, to control the display unit to display a destination arrival notice image on the designated location of the map image in response to determining that the current location is within a threshold range of the designated location.

12. The terminal of claim 10, wherein the storage unit stores a location data list comprising location information.

13. The terminal of claim 10, wherein the controller sets the location data to the designated location using the current location data received from the Global Positioning System (GPS) module.

14. The terminal of claim 12, wherein the controller sets the location data to the designated location using the location data list stored in the storage unit.

15. The terminal of claim 12, wherein, if the designated data comprises at least a first designated location and a second designated location, the controller calculates a distance between the first designated location and the second designated location, and, in response to determining that the distance is greater than a threshold distance, controls the display unit to display at least one intermediate location on the map image, and to set location data to the displayed intermediate location.

16. An apparatus for providing location information, comprising:
- a processor configured to detect a map image triggering event based on an input, wherein the processor is further configured to generate location data of a designated location, the location data being selected via input of a search query, being set to a map image in response to detection of the map image triggering event, and comprising actual geographic location information received in response to the input of the search query; and
- a mapping table, coupled to the processor, configured to determine whether a current location data and the location data of the designated location are identical, and
- wherein an arrival notice is caused to be provided by the processor in response to the current location data being the same as the location data of the designated location,
- wherein the map image triggering event comprises a request to provide an interface to create a map.

17. The apparatus of claim 16, wherein the current location data is based on data transmitted from the Global Positioning System (GPS).

18. The apparatus of claim 16, wherein the designated location comprises a destination location and an intermediate location.

* * * * *